United States Patent [19]

Martin et al.

[11] Patent Number: 4,935,628
[45] Date of Patent: Jun. 19, 1990

[54] METHOD AND APPARATUS FOR DETECTING INKS

[75] Inventors: Anthony Martin; Paul D. Lacey, both of Hampshire, England

[73] Assignee: De La Rue Systems Ltd., United Kingdom

[21] Appl. No.: 262,596

[22] Filed: Oct. 26, 1988

[30] Foreign Application Priority Data

Oct. 26, 1987 [GB] United Kingdom ............... 8725034

[51] Int. Cl.$^5$ ............................................. G01N 21/35
[52] U.S. Cl. .................................... 250/339; 250/341; 250/351
[58] Field of Search ............... 250/459.1, 458.1, 339, 250/341, 351

[56] References Cited

U.S. PATENT DOCUMENTS

| 3,650,400 | 3/1972 | Warren et al. ...................... 250/365 |
| 3,933,094 | 1/1976 | Murphy et al. ...................... 283/88 |
| 3,971,951 | 7/1976 | Rikukawa et al. ............... 250/458.1 |

FOREIGN PATENT DOCUMENTS

| 77917 | 5/1983 | European Pat. Off. . |
| 83062 | 7/1983 | European Pat. Off. . |
| 125060 | 11/1984 | European Pat. Off. . |
| 152979 | 8/1985 | European Pat. Off. . |
| 181228 | 5/1986 | European Pat. Off. . |
| 2107911A | 5/1983 | United Kingdom . |

Primary Examiner—Constantine Hannaher
Attorney, Agent, or Firm—Ostrolenk, Faber, Gerb & Soffen

[57] ABSTRACT

Apparatus for detecting the presence of an ink on a substrate comprises a number of LEDs (1) for irradiating the substrate (2) with radiation at at least two different wavelengths, at least one of the wavelengths being chosen to correspond to an absorption or relectance wavelength of the ink to be detected. A sequence generator (5) modulates the radiation at each wavelength in a respective, different manner. A radiation sensor (3) senses radiation emitted by the substrate (2). A correlator (7,8) correlates samples of the sensed radiation from the radiation sensor (3) with signals each of which is modulated by a respective one of the modulations applied to the radiation, to generate correlation signals. A monitor (9) monitors the correlation signals in order to detect the presence of the said ink.

13 Claims, 2 Drawing Sheets

METHOD AND APPARATUS FOR DETECTING INKS

FIELD OF THE INVENTION

The invention relates to methods and apparatus for detecting the presence of an ink on a substrate.

DESCRIPTION OF THE PRIOR ART

It is known to print on substrates such as security documents and banknotes inks which, although appearing to have the same colour in the optical wavelength range, differ in their spectral absorption characteristics outside the optical range. We have devised a method and apparatus for detecting the presence of such inks.

SUMMARY OF THE INVENTION

In accordance with one aspect of the present invention, a method of detecting the presence of an ink on a substrate comprises irradiating the substrate with radiation at at least two different wavelengths, the radiation at each wavelength being modulated in a respective, different manner, and at least one of the wavelengths being chosen to correspond to an absorption or reflection wavelength of the ink to be detected; sensing radiation emitted from the substrate and correlating samples of the sensed radiation with signals each of which is modulated by a respective one of the modulations applied to the radiation, to generate correlation signals; and monitoring the correlation signals in order to detect the presence of the said ink.

In accordance with a second aspect of the present invention, apparatus for detecting the presence of an ink on a substrate comprises irradiating means for irradiating the substrate with radiation at at least two different wavelengths, at least one of the wavelengths being chosen to correspond to an absorption or reflectance wavelength of the ink to be detected; modulation means for modulating the radiation at each wavelength in a respective, different manner; radiation sensing means for sensing radiation emitted by the substrate; correlating means for correlating samples of the sensed radiation from the radiation sensing means with signals each of which is modulated by a respective one of the modulations applied to the radiation, to generate correlation signals; and monitoring means for monitoring the correlation signals in order to detect the presence of the said ink.

In our invention, the substrate such as a security document or banknote is irradiated with radiation at at least two different wavelengths and the response of the inks to the irradiation is monitored by modulating each wavelength in a unique manner and synchronously demoduating the received radiation by correlating that radiation with each of the modulation sequences. The result of the demodulation will be a number of correlation signals which vary in magnitude in accordance with the degree of correlation and the intensity of the received radiation at each wavelength. Provided that the modulations which are applied are sufficiently different, a correlation signal of a significant magnitude will only be generated when the received radiation includes a wavelength corresponding to the modulated signal which is correlated with it.

The invention has a number of advantages. In particular, broad band noise due, for example, to ambient light, is eliminated by the correlation technique. Also, the invention enables a single radiation receiver to be used.

Preferably, the modulations comprise phase shifted versions of a common modulation sequence such as a pseudo-random binary sequence. This leads to a very simple construction for the apparatus and, in the case of the use of a pseudo-random binary sequence enables well known correlation techniques to be adopted. This is discussed in more detail in "An Introduction to Identification" by J. P. Norton published by Academic Press (1986), pages 49–55.

Conveniently, the radiation sensing means comprises a common sensor for receiving radiation at each of the different wavelengths generated by the irradiating means.

It should be understood in this context that by "wavelength" we mean a band of wavelengths within which the wavelength in question is located, the wavelength bands not overlapping.

Correlation of the radiation can be achieved in a variety of known ways but is conveniently carried out by multiplying each sample of the sensed radiation with a respective one of the modulated signals and integrating the resultant multipled signals over a cycle of the modulation.

In any single apparatus according to the invention, the number of different wavelengths which can be used depends on the number of available modulations. In the case where phase shifted versions of a common modulation sequence are used, the number of wavelengths will depend on the length of the sequence.

To increase the number of wavelengths, a number of such apparatus according to the invention may be placed side by side. Furthermore, by providing more than one apparatus, the presence of an ink on different parts of the substrate can be detected. In this case, if the modulations applied to each apparatus are different then each apparatus will be immune to stray irradiation from neighbouring apparatus.

The correlation signals may be monitored in a variety of ways. For example, where one signal corresponds to radiation in the optical waveband and another signal to radiation outside the optical waveband (for example infra-red) then the signals may be compared with each other or a ratio between the signals may be determined, the result of either of these operations being compared with a previously determined value to indicate the presence or absence of the ink. Thus, where two inks have the same colour in the optical waveband and different spectral responses outside the optical waveband, then the ratio between the respective signals will differ depending upon which ink is being irradiated.

The invention is applicable in a wide variety of applications but is particularly suitable for use with banknote sorting machines in which banknotes are sorted into acceptable and unacceptable types depending upon the presence or absence respectively of certain inks.

Typically, the radiation which is sensed will have been reflected from the substrate although alternatively radiation passing through the substrate could be sensed.

BRIEF DESCRIPTION OF THE DRAWINGS

In order that the invention may be better understood, an example of a method and apparatus for detecting the presence of an ink on a document in accordance with the present invention will now be described with reference to the accompanying drawings, in which.

DETAILED DESCRIPTION OF AN EMBODIMENT

Figure 1:
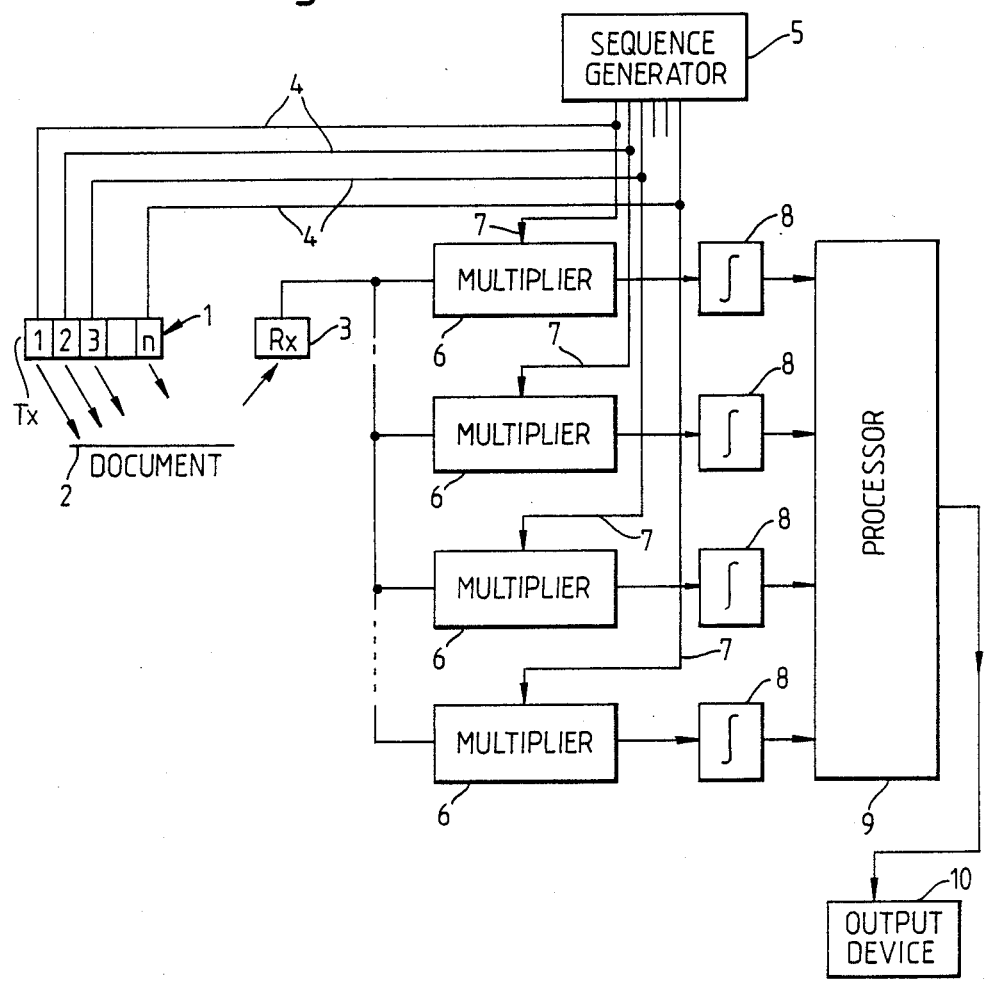
FIG. 1 is a block diagram of the apparatus.

The apparatus shown in FIG. 1 comprises a number n of light emitting diodes (LEDs) 1 which generate radiation at a corresponding number of different wavelengths some of which are in the optical range and some of which are outside the optical range, typically in the infrared range. The LEDs 1 irradiate a document 2 which is carried beneath the LEDs by means not shown. The wavelength of the radiation generated by at least one of the LEDs 1 is chosen to correspond with an absorption band of an ink which is expected to be printed on the document.

A single detector 3 is positioned above the document 2 to receive radiation reflected by the document. Alternatively, the detector 3 could be below the document.

The LEDs 1 are controlled by respective control lines 4 from a sequence generator 5 to generate respective modulated radiation beams in a manner to be described below. The sequence generator 5 generates respective modulation signals which are fed to the LEDs 1 which then generate the modulated radiation beams.

The output signal from the detector 3 which represents the intensity of the incident radiation on the detector 3, the detector 3 being responsive to all wavelengths generated by the LEDs 1, is fed in parallel to a set of multiplying circuits 6, one for each LED. In addition, each multiplier 6 receives the modulation signal from the sequence generator 5 corresponding to the associated LED 1, via respective lines 7.

The output signals from the multipliers 6 are fed to respective integrating circuits 8, the output signals from the integrators being fed to a microprocessor 9. The microprocessor 9 monitors the incoming (correlation) signals and generates output signals related to the inks which are detected as a result of that monitoring, the output signals being fed to an output device 10 such as a monitor or printer.

Figure 2A:
FIGS. 2A and 2B illustrate two modulation sequences.
Figure 2B:
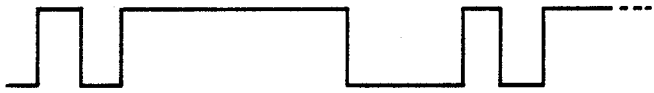

Since a common detector 3 is provided, it is necessary for the apparatus to distinguish between the different wavelengths of radiation which are reflected by the document 2. This is achieved by uniquely encoding each irradiation source (LED) 1 by modulating it with a pseudo random binary sequence (PRBS) generated by the sequence generator 5. An example of such a sequence is shown in FIG. 2A. In order that each LED 1 is modulated with a different sequence, differently phase shifted versions of the sequence shown in FIG. 2A are fed to the other LEDs 1. An example of a phase shifted version of the sequence is shown in FIG. 2B.

The PRBS is a broad band signal with a correspondingly narrow autocorrelation function. This property is used to discriminate different signals or channels from one another. The autocorrelation function of the signal describes how well a signal correlates with shifted versions of itself and in the case of the PRBS this function will be zero unless the incoming signal is correlated with the same modulation sequence that generated it. In this way, noise due to ambient light and the like as well as stray light from other adjacent apparatus and wavelengths not associated with a particular channel are automatically eliminated.

Figure 2C:
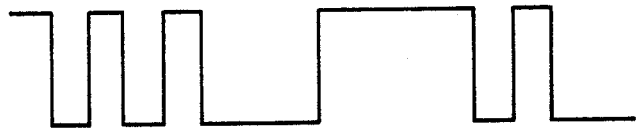
FIGS. 2C and 2D illustrate the signals output at two positions in the apparatus.
Figure 2D:
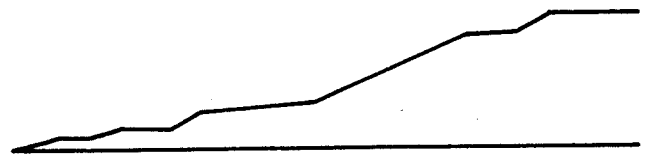

Correlation is achieved by multiplying the two signals together in the multiplying circuits 6 which generate an output of the form shown in FIG. 2C and subsequently integrating the result in the integrators 8 which generate an output of the form shown in FIG. 2D. This system correlates the returned signal with each of the irradiation modulation sequences.

The correlation result used by the system processor can be defined mathematically as:

$$\phi(nT - T) \text{ for } t \neq nT \, n = 0 \ldots \infty \text{ and}$$

$$\phi(t) = 0 \text{ if } t = nT + \delta T =$$

$$\frac{1}{A} \int_{nT + \delta T}^{nT + T} x(t) \, x(t + \tau) \, dt \, ft \neq nT + \delta T$$

where
n is the sample number
T is the integration period
x(t) is the original sequence (FIG. 2A)
x(t+τ) is the phase shifted sequence (FIG. 2B)
A is a scaling factor dependent on the system response.

The output signals from the integrators 8 indicate whether or not the wavelength associated with a particular channel has been reflected by the document 2 and in that case may indicate the presence of a particular ink which has the characteristic of reflecting radiation within that particular wavelength band. In practice, although n channels have been shown in FIG. 1, a typical system would make use of just two channels.

The correlation signals are then compared by the microprocessor 9. In the case where just two channels are provided (corresponding for example to respective wavelengths in and out of the optical band), this comparison may involve determining the difference between the correlation signals and/or the ratio between the correlation signals and then comparing these values with predetermined calibration windows or thresholds. If the computed results fall within the windows or above the thresholds then an output signal is provided to the output device 10 indicating the presence of the ink concerned. This indication can then be used to control the feeding of the document in a conventional manner.

We claim:

1. A method of detecting the presence of an ink on a substrate, the method comprising irradiating said substrate with radiation at at least two different wavelengths, said radiation at each said wavelength being modulated in a respective, different manner, and at least one of said wavelengths being chosen to correspond to one of an absorption wavelength and a reflection wavelength of the ink to be detected; sensing radiation emitted from said substrate and correlating samples of said sensed radiation with signals each of which is modulated by a respective one of said modulations applied to said radiation, to generate correlation signals; and monitoring said correlation signals in order to detect the presence of the said ink.

2. A method according to claim 1, wherein said modulations comprise phase shifted versions of a common modulation sequence.

3. A method according to claim 1, wherein said modulation comprises a pseudo-random binary sequence.

4. A method according to claim 1, wherein one of said wavelengths lies in the optical range, and another of said wavelengths lies outside the optical range.

5. A method according to claim 1, wherein said correlating step comprises multiplying each sample of said sensed radiation with a respective one of said modulated signals and integrating the resultant multipled signals over a cycle of said modulation.

6. A method according to claim 1, wherein said sensing step comprises sensing radiation reflected by said substrate.

7. A method according to claim 1, wherein the substrate comprises a bank note.

8. Apparatus for detecting the presence of an ink on a substrate, the apparatus comprising irradiating means for irradiating said substrate with radiation at at least two different wavelengths, at least one of said wavelengths being chosen to correspond to one of an absorption wavelength and a reflectance wavelength of said ink to be detected; modulation means for modulating said radiation at each said wavelength in a respective, different manner; radiation sensing means for sensing radiation emitted by said substrate; correlating means for correlating samples of said sensed radiation from said radiation sensing means with signals each of which is modulated by a respective one of said modulations applied to said radiation, to generate correlation signals; and monitoring means for monitoring said correlation signals in order to detect the presence of the said ink.

9. Apparatus according to claim 8, wherein said radiation sensing means comprises a common sensor for receiving radiation at each of said different wavelengths generated by said irradiating means.

10. Apparatus according to claim 8, wherein said correlating means comprises a number of multiplying circuits, one for each said wavelength, each said multiplying circuit receiving a sample of said radiation sensed by said radiation sensing means and a signal which has been modulated in the same way as said radiation wavelength corresponding to that multiplying circuit; and integrating means to which the output signal from said multiplying circuit is fed, said integrating means integrating the incoming signal over a cycle of said modulation.

11. Apparatus according to claim 8, wherein said modulating means causes each wavelength to be modulated in a respective pseudo-random binary sequence.

12. Apparatus according to claim 8, wherein said modulating means modulates said radiation at each wavelength with respective phase shifted versions of a common modulation sequence.

13. Apparatus according to claim 8, wherein the substrate comprises a bank note.

* * * * *